Aug. 6, 1935.  M. W. HANKS  2,010,664
CONTROLLING MEANS FOR HEATERS
Filed May 20, 1932
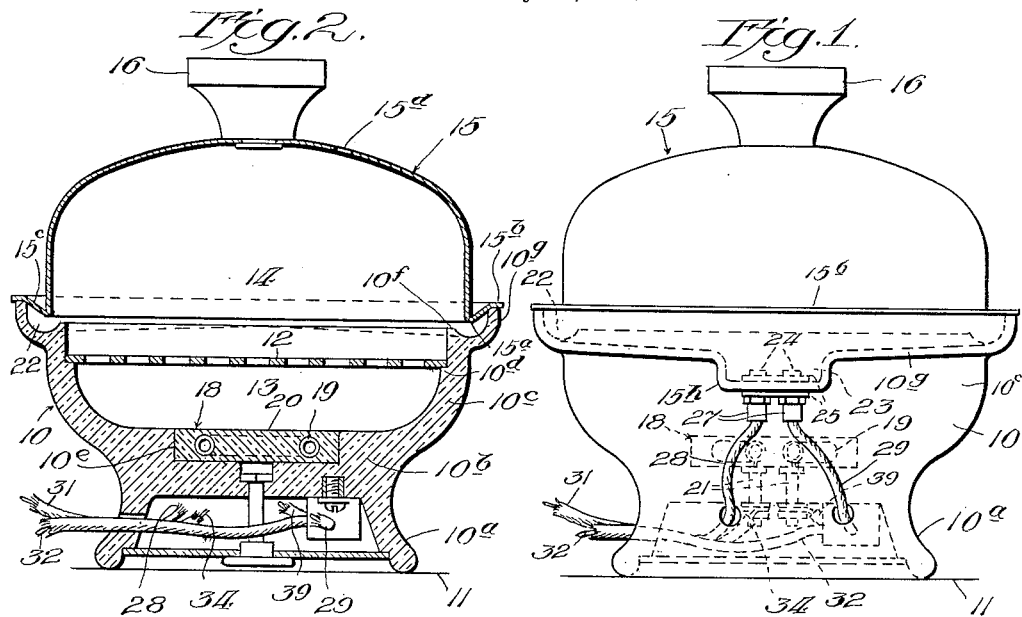
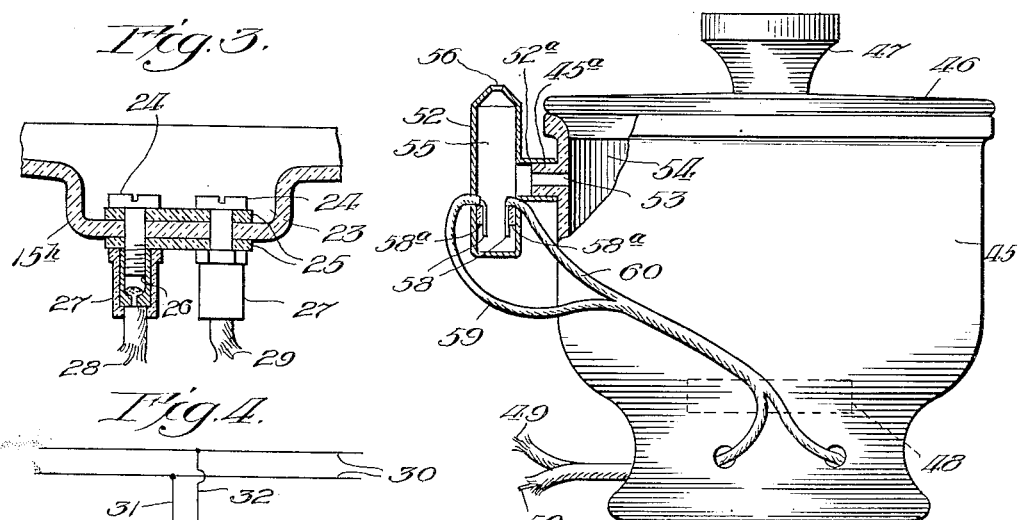
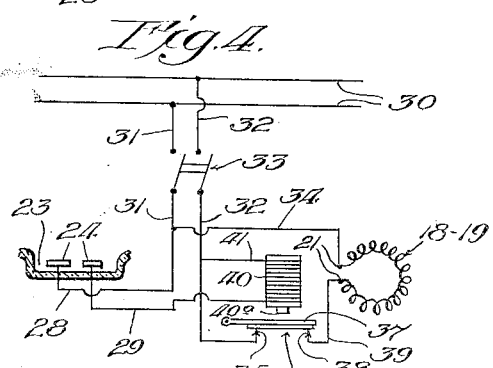
Inventor:
Marshall W. Hanks
by Rector, Hibben, Davis & Macauley,
Attys Patented Aug. 6, 1935

2,010,664

UNITED STATES PATENT OFFICE 2,010,664

CONTROLLING MEANS FOR HEATERS

Marshall W. Hanks, Madison, Wis.

Application May 20, 1932, Serial No. 612,515

6 Claims. (Cl. 219—43)

This invention relates to improvements in controlling means for heating and cooking devices and may be used with particular advantage in connection with electric heating and cooking devices, the purpose being to provide means responsive to vapor generated by the heating or cooking apparatus for discontinuing or changing the operation of that apparatus at a predetermined time. In certain of my prior patents, including United States Letters Patent No. 1,175,442, dated March 14, 1916, and No. 1,683,070, dated September 4, 1928, I have described liquid conductor heaters in which the current passes between electrodes through a liquid conductor which is applied to the electrodes in a measured quantity so that when it is evaporated to substantial dryness, the operation of the apparatus is discontinued, thereby giving the apparatus a predetermined time period of operation. The present invention is distinguished chiefly from the inventions of said prior patents in that it provides means whereby electric heating and cooking devices, whether of the liquid conductor type or of other types, may have definite time periods, or task-performing periods, of operation without evaporating to substantial dryness the liquid which is heated by the apparatus during its operation.

The principal object of the present invention is to provide improved controlling means for heating devices, such as electric heating and cooking utensils, for example, in which the period of operation of the apparatus is determined automatically by the quantity of vapor which is generated by the operation of the apparatus. A further object of the invention is to provide improved controlling means for electric heating devices and the like in which the termination of the operation of the apparatus is effected by the condensation of vapor produced during the normal operation of the apparatus. Still another object of the invention is to provide an electric heating device comprising electrically operated means for heating a liquid and generating a vapor in combination with means actuated automatically by the condensation of said vapor for controlling the circuit of the device and arresting or modifying its operation at the end of a predetermined period. Another object of the invention is to provide an electric heating or cooking device comprising a vessel having heating means therein in combination with means for collecting the condensate of vapor produced by the operation of said heating means so that the condensate establishes a circuit arranged to arrest or regulate the operation of said heating means and thereby discontinue or modify the operation of the heating or cooking device. Other objects of the invention relate to various features of construction and arrangement which will appear more fully hereinafter.

The nature of the invention will be understood from the following specification taken with the accompanying drawing, in which two embodiments are illustrated. In the drawing, Fig. 1 shows a side elevation of one form of electric heating or cooking device embodying the features of the present invention;

Fig. 2 is a vertical section taken through the vertical center line of the device illustrated in Fig. 1;

Fig. 3 is an enlarged vertical section through a portion of the annular trough embodied in the construction of Figs. 1 and 2, illustrating the electrodes which are connected by the condensate of the vapor produced by the operation of the device;

Fig. 4 is a somewhat diagrammatic view of the electric circuit connections of the device illustrated in Figs. 1 and 2; and Fig. 5 is a side elevation of a modified form of the invention showing a portion thereof in vertical section.

As illustrated in Figs. 1 to 4, inclusive, the invention is embodied in an electric heating or cooking device comprising a vessel 10 formed of porcelain or other heat insulating and electrical insulating material. This vessel is provided with a depending outwardly flaring flange or skirt 10$^a$ which is adapted to rest upon the table or other support 11 and this flange is united with the comparatively thick bottom wall 10$^b$ having an annular outer wall 10$^c$ extending outwardly and upwardly therefrom. This wall 10$^c$ is provided with an annular shoulder or ledge 10$^d$ upon which rests a perforated tray or partition wall 12 for supporting the objects to be heated or cooked by the operation of the apparatus. This tray divides the space within the vessel into two chambers including a liquid heating and vaporizing space or chamber 13 located beneath it and a vapor space or heating chamber 14 located above it beneath the metallic dome or cover 15 which rests upon the vessel 10. This cover is provided with a centrally located handle 16 which may be hollow and serve as a funnel for introducing liquid into the vessel, as disclosed in one of my prior patents above referred to.

The liquid which is introduced into the vessel 10 occupies the space 13 beneath the perforated division wall 12 and it is adapted to be heated by a heating unit 18 which preferably occupies a cylindrical depression 10e formed in the bottom wall 10b of the vessel. This heating unit may be in the form of spaced electrodes connected in an electric circuit, as disclosed in my prior patents above referred to, or it may consist of a heating coil 19 of high resistance wire embedded in a plate of insulating material 20. The electrodes or the terminals of the heating coil 19 are connected to a pair of terminal posts 21 which are mounted in the bottom wall 10b for connection in an electric circuit so that when the circuit is closed to cause current to pass through the heating coil 19 or between the electrodes of the heating unit, heat is generated at the bottom of the chamber 13 and the liquid therein is heated with the result that vapor is produced which passes upwardly through the perforations in the division wall 12 and heats the space 14 in which objects may be located to be cooked, for example. The vessel may, of course, be heated by a gas burner which may be connected to be controlled by the apparatus hereinafter described.

During the operation of the apparatus, the vapor produced by the heating unit gradually collects upon the inner surface of the metallic dome or cover 15, the outer surface of which is exposed to the cooler surrounding atmosphere, and this dome is so shaped that its inner surface inclines outwardly and downwardly from the center to cause the collecting vapor condensate to flow downwardly and drop off of the annular edge portion 15a of the cover into an annular channel 22 which is formed between the two flanges 10f and 10g of the vessel 10 around the upper edge thereof. The flange 10g which forms the outer wall of the trough or channel 22 extends upwardly beyond the upper edge of the inner flange 10f and is adapted to form a seat for the outer edge portion 15b of an annular flange 15c which is formed on the lower edge of the cover 15 and inclined upwardly and outwardly therefrom. The flange 15c and the outer wall of the cover 15 thus converge downwardly to the annular edge 15a from which the condensate drops into the channel 22 and as the operation of the apparatus continues, the amount of liquid which is thus collected in the channel 22 gradually increases, although the accumulation may be retarded somewhat by providing a vent opening 15d in the upper part of the cover to allow some of the vapor to escape to the atmosphere.

The trough or channel 22 has a gradual incline around the circumference of the vessel toward a well or pocket 23 which is formed by a depression 15h formed in the lower wall of the channel, as shown particularly in Fig. 3. In the bottom of this well or depression there are mounted a pair of electrodes or contact plates 24 which are spaced apart and may be formed as the heads of screws 24a which extend downwardly through a pair of insulating plates 25 located on the upper and lower sides of the bottom wall of this well or depression. The lower ends of these screws threadedly engage the metallic linings 26 of a pair of insulating nuts 27 which are engaged at their lower ends by metallic conductors 28 and 29 provided with insulating coverings and having the metallic portions thereof connected to the metallic linings 26. In this way, the two contact plates or electrodes 24 are connected to certain conductors of the electric circuit and when the amount of liquid condensate collecting in the well or depression 23 is sufficient to establish an electrical connection between these plates 24, current is caused to flow through a branch circuit which operates certain means for automatically effecting the discontinuance or regulation of the operation of the heating unit 18. In this way, the condensate of the vapor produced by the operation of the apparatus, which is proportional to the length of time the apparatus has been in operation and the amount of heat generated thereby, is utilized for automatically arresting the operation of the apparatus at the end of a certain period of time or upon the completion of a certain heating operation to be performed by the apparatus.

One arrangement of circuit connections for the apparatus of the present invention is illustrated in Fig. 4 which includes, somewhat diagrammatically, certain of the elements and conductors illustrated in Figs. 1, 2 and 3. As illustrated in Fig. 4, two line conductors 30 lead from a source of current supply and are connected to a pair of conductors 31 and 32 having connected therein a double pole switch 33 for permitting the manual control of the supply of current to the apparatus. One of these conductors 31 is connected by a conductor 34 with one of the terminals 21 of the heating unit 18. The other conductor 32 leads directly to one contact 35 of a circuit controlling device 36 which may preferably be mounted on the under side of the bottom wall 10b of the vessel, as shown in Fig. 2. This controlling device comprises a movably mounted armature and contact plate 37 which is adapted to engage the contact 35 and also another similar contact 38 for establishing an electrical connection between them. The contact 38 is connected by another conductor 39 to the other terminal 21 of the heating unit 18 so that when the parts are in the relative positions shown in Fig. 4, the circuit is completed through the heating unit 18 to cause the heating and vaporization of the liquid contained within the vessel 10.

For the purpose of automatically arresting the operation of the apparatus at a predetermined time or after the completion of a predetermined heating operation, the previously described conductor 28, connected to one of the contact plates 24, is connected to the conductor 34 leading from the source of supply, as shown in Fig. 4, and the previously described conductor 29, connected to the other contact plate or electrode 24, is connected to the winding of a solenoid 40 which has its other terminal connected by a conductor 41 to the conductor 32, thus completing the circuit through the solenoid to the other side of the supply circuit. The solenoid 40 has a magnetizable core 40a, the end of which is located in proximity to the armature 37 which is formed of magnetizable material, so that when the solenoid is energized by the passage of current through the branch circuits just described, the armature 37 is elevated to break the connection between the contacts 35 and 38, thereby opening the circuit of the heating unit 18. The completion of the branch circuit which brings about the opening of the main circuit including the heating unit 18, is brought about by the collection of moisture in the depression 23 which establishes a connection between the contact plates 24, as previously described.

In Fig. 5 of the drawing, there is illustrated a modified form of the invention comprising a vessel 45, formed of porcelain or other suitable material, which is provided with a cover 46 having a handle 47 constructed to serve as a funnel through which liquid may be poured into the inner chamber of the vessel. This vessel has mounted therein an electric heating unit 48 which may be similar to the heating unit 18 previously described and this heating unit is supplied with current through condctors 49 and 50 leading from a source of supply, as prevously explained in connection with the circuit of Fig. 4. Instead of providing a trough for collecting moisture which condenses on the inner wall of the vessel itself, the automatic circuit control is brought about in this construction by means of an auxiliary casing 52 which communicates with the interior of the casing 45 through a passage 53 formed in a projecting boss 45ᵃ formed on the casing and having a telescoping engagement with the sleeve 52ᵃ which is formed on the auxiliary casing. The vapor which is created in the heating space 54 of the vessel 45 passes through the opening 53 into the chamber 55 of the auxiliary casing which is preferably formed of metal and which may have a vent opening 56 at the upper end thereof. The vapor which does not escape through the vent opening 56 is condensed on the inner surfaces of the walls of the auxiliary casing so that a quantity of liquid gradually collects in the bottom of the chamber 55 and ultimately establishes a connection between the contact plates 58 which are mounted on insulating blocks 58ᵃ carried by the wall of the auxiliary casing and which projects downwardly therefrom toward the bottom wall of this casing. These contact plates 58 are connected to conductors 59 and 60 which correspond to the conductors 28 and 29 of the circuit connections previously described. When a sufficient quantity of liquid has collected in the bottom of the chamber 55 to connect the contact plates 58, current is caused to flow through the branch circuit previously described, thereby opening the main circuit and arresting the operation of the heating unit 48.

Although the invention is illustrated as being adapted to open the circuit of the heating device when a predetermined quantity of condensate collects, the solenoid could, of course, be actuated merely to change the quantity of current flowing through the heating device. In the forms illustrated, the condensate collecting in the depression where the electrodes are located establishes the branch circuit and thereby opens the circuit of the heater. The current which flows through the condensate between the electrodes causes this condensate to evaporate so that, if the supply of condensate ceases, the liquid in the depression will be evaporated to substantial dryness and thereby open the circuit of the solenoid so that the heater is again put in operation, while if the supply of condensate continues, the branch circuit will be continuously energized to open or control the main circuit of the heater.

Although two forms of the invention have been shown and described by way of illustration, it will be understood that it may be constructed in various other embodiments coming within the scope of the appended claims.

I claim:

1. The combination in a heating apparatus, of a vessel adapted to contain a liquid, heating means carried by said vessel for heating and vaporizing said liquid, means associated with said vessel for causing a portion of said vapor to condense, means for collecting the condensate of said vapor, and means including an electric circuit having contacts adapted to be connected by said condensate for controlling the operation of said heating means.

2. The combination in a heating apparatus, of a vessel adapted to contain a liquid, heating means for heating and vaporizing said liquid, means for condensing and collecting a portion of said vapor, an electric circuit for controlling the operation of said heating means, and means including a pair of contacts connected in said circuit and adapted to be connected with each other by said collected condensate for controlling the operation of said heating means by said circuit.

3. The combination in a heating apparatus, of a vessel of insulating material adapted to contain a liquid, heating means for heating and vaporizing said liquid, a trough carried by said vessel to collect the condensate of said vapor formed in the upper portion of said vessel, a pair of contacts spaced apart and adapted to be connected by the condensate collected in said trough, and means including an electric circuit connected to said heating device and having said contacts connected therein for rendering said heating device responsive to the amount of condensate collected in said trough.

4. The combination in a heating apparatus, of a vessel of insulating material having an annular trough around the upper edge thereof, a heating device in the lower part of said vessel for heating and vaporizing a liquid contained in said vessel, a cover for said vessel having a part projecting over said trough to cause the condensate of said vapor collecting on the inside of said cover to drain into said trough, a pair of metallic contacts spaced apart in said trough, and means including an electric circuit having said contacts connected therein for controlling the operation of said heating device.

5. The combination in a heating apparatus, of a vessel of insulating material having an annular trough around the upper edge thereof, a heating device in the lower part of said vessel for heating and vaporizing a liquid contained in said vessel, a cover for said vessel having a part projecting over said trough to cause the condensate of said vapor collecting on the inside of said cover to drain into said trough, said trough having a depression in which said condensate collects, a pair of metallic contacts located in said depression and adapted to be collected by said condensate, and means including an electric circuit having said contacts connected therein for controlling the operation of said heating device.

6. The combination in a heating apparatus, of a vessel of insulating material adapted to contain a liquid to be vaporized, a heating device for heating said liquid, an auxiliary casing having communication with said vessel to receive vapor therefrom, a pair of contacts spaced apart in said casing and adapted to be connected by the condensate of said vapor collecting therein, and means including an electric circuit adapted to be actuated when said contacts are connected to control the operation of said heating device.

MARSHALL W. HANKS.